US005631055A

United States Patent [19]

Vines et al.

[11] Patent Number: 5,631,055

[45] Date of Patent: May 20, 1997

[54] PAINT MASKING ASSEMBLY AND METHOD OF MASKING

[75] Inventors: Douglass M. Vines, Farminton Hills, Mich.; Gerald L. Vogler, Maplewood, Minn.; Richard C. Williams, River Falls, Wis.; Thomas G. Cheesebrow, Vadnais Heights, Minn.

[73] Assignee: Minnesota Mining and Manufacturing Company, St. Paul, Minn.

[21] Appl. No.: 18,427

[22] Filed: Feb. 17, 1993

Related U.S. Application Data

[63] Continuation of Ser. No. 595,395, Oct. 10, 1990, abandoned.

[51] Int. Cl.[6] .......... B32B 3/14

[52] U.S. Cl. .......... 428/40.1; 118/504; 118/505; 428/41.7; 428/41.8; 428/42.1; 428/42.2; 428/42.3; 428/43; 428/136; 428/354; 428/355 RA

[58] Field of Search .......... 428/40, 41, 42, 428/136, 343, 43, 220, 355, 354, 906; 118/504, 505; 427/272, 282

[56] References Cited

U.S. PATENT DOCUMENTS

| | | | |
|---|---|---|---|
| 3,315,386 | 4/1967 | Kest et al. | 40/2 |
| 3,315,387 | 4/1967 | Heuser | 40/2 |
| 3,501,365 | 3/1970 | Marshall | 161/38 |
| 3,752,304 | 8/1973 | Alef | 206/58 |
| 3,822,492 | 7/1974 | Crawley | 40/2 |
| 3,914,483 | 10/1975 | Stipek, Jr. | 428/42 |
| 4,032,679 | 6/1977 | Aoyagi | 428/42 |
| 4,420,520 | 12/1983 | Jones et al. | 428/42 |
| 4,430,137 | 2/1984 | Jones | 156/247 |
| 4,550,683 | 11/1985 | Jones | 118/505 |
| 4,584,219 | 4/1986 | Baartmans | 428/42 |
| 4,789,579 | 12/1988 | Tutas et al. | 428/41 |
| 4,796,330 | 1/1989 | Ziegler | 16/251 |
| 4,987,287 | 1/1991 | Jack | 428/40 |

FOREIGN PATENT DOCUMENTS

| | | |
|---|---|---|
| 0 207 720 A2 | 1/1987 | European Pat. Off. . |
| 2238982 | 2/1975 | France . |
| 2 112 731 | 10/1972 | Germany . |
| 1112686 | 5/1968 | United Kingdom . |

*Primary Examiner*—Nasser Ahmad
*Attorney, Agent, or Firm*—Gary L. Griswold; Walter N. Kirn; William L. Huebsch

[57] ABSTRACT

A paint masking assembly comprising a sheet of paint masking material having a layer of pressure sensitive adhesive releasably adhered to a sheet of liner material which is coextensive with and extends beyond the sheet of paint masking material, and is slit to define first and second parts of the sheet of liner material extending over first and second portions of the layer of pressure sensitive adhesive. The sheet of paint masking material is removable from the first part of the sheet of liner material to expose the first portion of the layer of pressure sensitive adhesive by which the the removed sheet of paint masking material may be releasably adhered to a substrate.

6 Claims, 3 Drawing Sheets

PAINT MASKING ASSEMBLY AND METHOD OF MASKING

This is a continuation of application Ser. No. 07/595,395 filed Oct. 10, 1990 now abandoned

TECHNICAL FIELD

The present invention relates to paint masking assemblies of the type each including at least one sheet of paint masking material adapted to be removed from the assembly and applied to a portion of a surface to be masked while an adjacent portion of the surface is painted, and to methods of using such paint masking assemblies.

BACKGROUND ART

Known masking assemblies of the type each including at least one sheet of paint masking material adapted to be removed from the assembly and applied to a portion of a surface to be masked while an adjacent portion of the surface is painted include sheets of paint masking material having peripheries of predetermined shapes and layers of pressure sensitive adhesive permanently adhered on one of their surfaces releasably adhered to a sheet of liner material which is at least coextensive with and may be larger than the sheets of paint masking material. When such sheets of paint masking material are removed and adhered to a surface, their entire surfaces are adhered to that surface by the layers of pressure sensitive adhesive which can cause them to be more difficult to remove than may be desired. Such known masking assemblies have also included continuous sheets of paint masking material having peripheries off predetermined shapes and layers of pressure sensitive adhesive permanently adhered on one of their surfaces releasably adhered to sheets of liner material which are the same shape as and coextensive with the sheets of paint masking material, which sheets of liner material are slit between their surfaces in a pattern that allows a part of the liner material to be peeled away leaving only predetermined portions of the layers of pressure sensitive adhesive on the sheets of paint masking material exposed to limit the amount of adhesion of those layers of pressure sensitive adhesive with surfaces to which the sheets of paint masking material are to be adhered. While such paint masking assemblies can restrict the amount of adhesion between the sheets of paint masking material and surfaces to which they are adhered, it is difficult for the applier to strip away the part of the liner material over the portion of the layer of pressure sensitive adhesive by which the sheets of paint masking material are to adhered to a surface. Master sheets bearing several sheets of paint masking material to be used on an object to be painted (e.g., a car body) have been made by first forming several of at least one type of the masking assemblies described above, removing at least a part of the liner material from that masking assembly, and adhering the pressure sensitive adhesive exposed on the sheets of paint masking material by that removal to the master sheet from which the sheets of paint masking material can be removed and adhered to surfaces to be masked. Such master sheets are generally hand assembled, and are thus very expensive to make.

Also, die cut tape pads can be formed from sheets of paint masking material which are either only coated on certain portions with pressure sensitive adhesive, as is described in U.S. Pat. No. 4,420,520; or which are coated with pressure sensitive adhesive on one entire surface, and then have portions of those layers of pressure sensitive adhesive overcoated (as by printing techniques) with a detackifier as is described in U.S. Pat. No. 4,842,919.

DISCLOSURE OF INVENTION

The present invention provides a paint masking assembly which is easy and inexpensive to make and includes a sheet of paint masking material that can be quickly and easily separated from a release liner, while being easily adapted so that only desired portions of the sheet of paint masking material will be adhered to a portion of a surface to be masked, or so that the sheet of paint masking material can be easily located along a portion of a surface to which it is to be adhered.

According to the present invention there is provided a paint masking assembly comprising a sheet of liner material and at least one continuous sheet of paint masking material having a periphery of a predetermined shape and a layer of pressure sensitive adhesive permanently adhered on one of its surfaces releasably adhered to the sheet of liner material. The sheet of liner material extends across the entire layer of pressure sensitive adhesive and past the periphery of the sheet of paint masking material, and is slit to define first and second parts of the sheet of liner material extending over first and second portions of the layer of pressure sensitive adhesive. The sheet of paint masking material is removable from the first part of the sheet of liner material to expose the first portion of the layer of pressure sensitive adhesive by which the removed sheet of paint masking material may be releasably adhered to a portion of a surface of a substrate.

In one embodiment, the second part of the sheet of liner material has a periphery entirely spaced from the periphery of the sheet of paint masking material so that the first portion of the layer of pressure sensitive adhesive extends in a continuous band around the entire periphery of the sheet of paint masking material. This embodiment is particularly useful where a large surface portion is to be masked in that after the sheet of paint masking material is removed from the first part of the sheet of liner material the first portion of the layer of pressure sensitive adhesive can securely adhere the paint masking material in place adjacent its periphery, and the central portion of the sheet of paint masking material, because it is covered by the second part of the sheet of liner material will not be adhered to the surface portion being masked, and thus need not be peeled away from that surface portion after the painting of an adjacent surface portion is complete.

In another embodiment, the second part of the sheet of liner material projects past a portion of the periphery of the sheet of paint masking material. This embodiment can be useful where a portion of a surface to be masked is spaced from certain structure along that surface in that after the sheet of paint masking material is removed from the first part of the sheet of liner material the projecting second part of the sheet of liner material can be used to properly locate the sheet of paint masking material from that structure, the first portion of the layer of pressure sensitive adhesive can adhere the paint masking material in place in its proper location, at least a section of the second part of the sheet of liner material can then be peeled from between the paint masking material and the surface to be masked, and the portion of the layer of pressure sensitive adhesive originally adhered to the second part of the sheet of liner material can then also be releasably adhered to the portion of the surface to be masked during the painting operation.

The paint masking assembly can be only a single sheet of paint masking material on a sheet of liner material, or can be a plurality of sheets of paint masking material adhered along an elongate sheet of liner material that can, for example, be wound in a coil around a hub of a reel from which the sheets of paint masking material are sequentially removed. In all of the embodiments, at least one edge of at least one of the sheets of paint masking material either is always exposed or presented for manual engagement along a portion of the sheet of liner material that extends past the sheet of paint masking material, or will become exposed or presented for manual engagement along the portion of the sheet of liner material that extends past the sheet of paint masking material when an adjacent sheet of paint masking material is removed from the sheet of liner material. Such exposed edges greatly facilitate manual removal of the sheet of paint masking material from the first part of the sheet of liner material. To afford their use in masking portions of surfaces such as on automobiles or other painted vehicles or structures, the sheet of paint masking material and the layer of pressure sensitive adhesive while adhered to the portion of the surface to be masked should withstand baking for at least one half hour well up into the range of temperatures commonly used in curing paint on automobiles and other painted vehicles and structures (i.e., 140 to 350 degrees Fahrenheit) such as at at least 250 degrees Fahrenheit, and preferably at at least 275 degrees Fahrenheit, while still being cleanly and easily manually removable from the surface portion after such baking without leaving any of the layer of pressure sensitive adhesive on the surface portion.

BRIEF DESCRIPTION OF THE DRAWINGS

The present invention will be further described with reference to the accompanying drawing wherein like reference numerals refer to like parts in the several views, and wherein.

DETAILED DESCRIPTION

Figure 1:
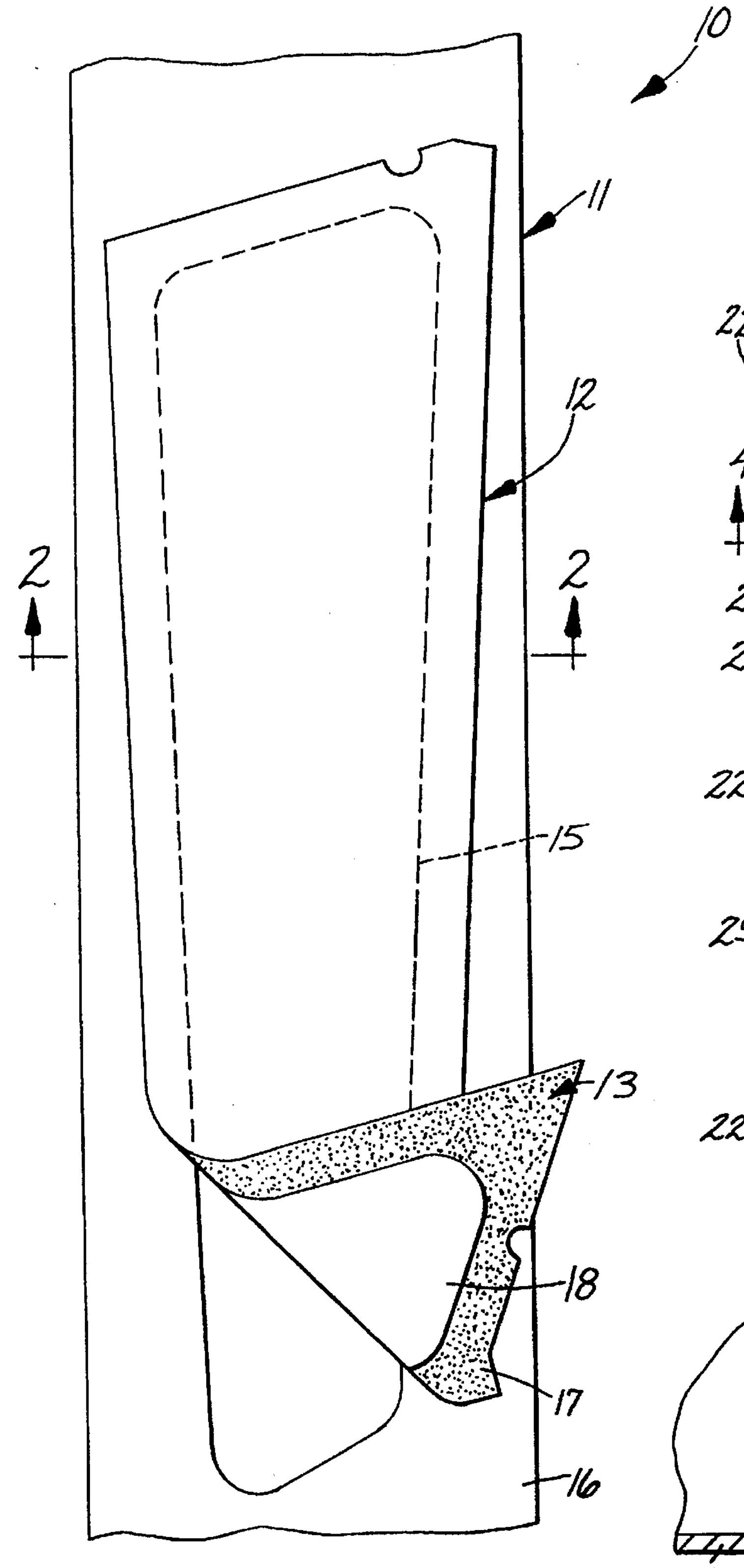
FIG. 1 is a plan view of a first embodiment of a paint masking assembly according to the present invention having a corner of a sheet of paint masking material with a second part of a sheet of liner material adhered thereto turned back in the manner they are removed from a first part of the sheet of liner material during use of the paint masking assembly.
Figure 2:
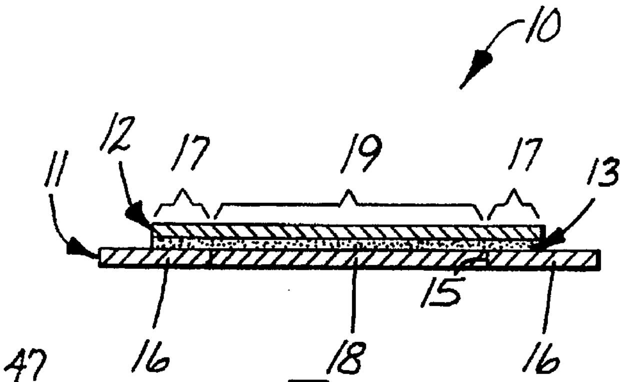
FIG. 2 is a sectional view taken approximately along line 2—2 of FIG. 1.

Referring now to FIGS. 1 and 2 of the drawing, there is shown a first embodiment of a paint masking assembly according to the present invention generally designated by the reference numeral 10.

Generally the paint masking assembly 10 comprises a sheet 11 of liner material, and a continuous sheet 12 of paint masking material having a periphery of a predetermined shape, and a layer 13 of pressure sensitive adhesive permanently adhered on one of its major surfaces, the layer 13 of pressure sensitive adhesive being releasably adhered to the sheet 11 of liner material. The sheet 11 of liner material extends across the entire layer 13 of pressure sensitive adhesive and past the periphery of the sheet 12 of paint masking material, and in this embodiment has a periphery spaced from and extending around the entire periphery of the sheet 12 of paint masking material so that the entire peripheral edge of the sheet 12 of paint masking material is exposed or presented for manual engagement along the surface of the sheet 11 of liner material to facilitate manual removal of the sheet 12 of paint masking material from the sheet 11 of liner material. The sheet 11 of liner material has a slit 15 between its major surfaces to define a first part 16 of the sheet 11 of liner material extending over a first portion 17 of the layer 13 of pressure sensitive adhesive, and a second part 18 of the sheet 11 of liner material extending over a second portion 19 of the layer 13 of pressure sensitive adhesive. The second part 18 of the sheet 11 of liner material has a periphery entirely spaced from the periphery of the sheet 12 of paint masking material so that the first portion 17 of the layer 13 of pressure sensitive adhesive extends in a continuous band around the entire periphery of the sheet 12 of paint masking material. The sheet 12 of paint masking material is removable from the first part 16 of the sheet 11 of liner material (FIG. 1) to expose the first portion 17 of the layer 13 of pressure sensitive adhesive by which first portion 17 of the layer 13 of pressure sensitive adhesive the removed sheet 12 of paint masking material may be releasably adhered to a portion of a surface to be masked. This embodiment is particularly useful where a large surface area is to be masked (e.g., the surface of a post between window openings on an automobile body). After the sheet 12 of paint masking material is removed from the first part 16 of the sheet 11 of liner material the first portion 17 of the layer 13 of pressure sensitive adhesive can securely adhere the sheet 12 of paint masking material in place adjacent its periphery. The central portion of the sheet 12 of paint masking material, because it is covered by the second part 18 of the sheet 11 of liner material, will not be adhered to the portion of the surface being masked, and thus need not be peeled away from that surface portion after the painting of an adjacent portion of the surface is complete.

Figure 3:
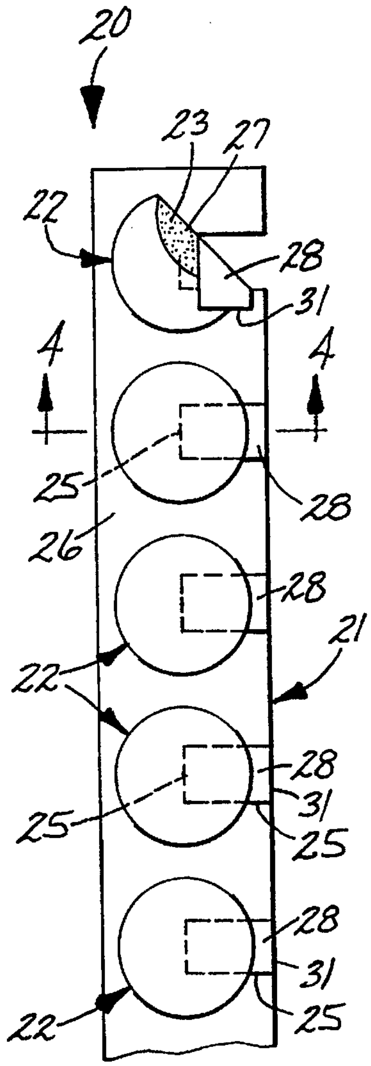
FIG. 3 is a plan view of a second embodiment of a paint masking assembly according to the present invention which includes a plurality of sheets of paint masking material, one of which with a second part of a sheet of liner material adhered thereto is illustrated with a corner turned back in the manner it would be removed from a first part of the sheet of liner material.
Figure 5:
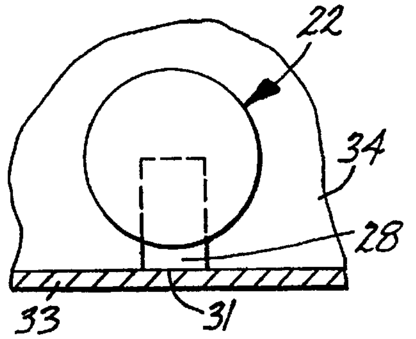
FIG. 5 illustrates one of the sheets of paint masking material from the embodiment of the paint masking assembly of FIG. 2 with the second part of the sheet of liner material adhered thereto being applied to a surface.
Figure 4:
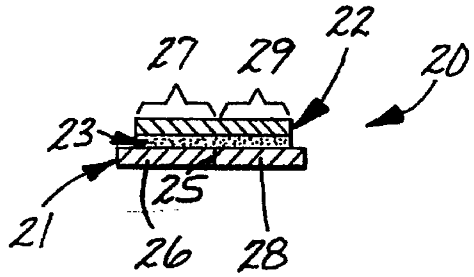
FIG. 4 is a sectional view taken approximately along line 4—4 of FIG. 3.

Referring now to FIGS. 3, 4 and 5 of the drawing, there is shown a second embodiment of a paint masking assembly according to the present invention generally designated by the reference numeral 20.

Generally the paint masking assembly 20 comprises an elongate sheet 21 of liner material, and a plurality of continuous sheets 22 of paint masking material each having a periphery of a predetermined circular shape, and a layer 23 of pressure sensitive adhesive permanently adhered on one of its major surfaces; the layers 23 of pressure sensitive adhesive of the sheets 22 of masking material being releasably adhered along the sheet 21 of liner material. The sheet 21 of liner material extends across the entire layer 23 of pressure sensitive adhesive and past the periphery of each of the sheets 22 of paint masking material, and in this embodiment has a periphery spaced from and extending around the entire periphery of the sheet so that the entire peripheral edge of each of the sheets 22 of paint masking material is exposed or presented for manual engagement along the surface of the sheet 21 of liner material to facilitate manual removal of the sheet 22 of paint masking material from the sheet 21 of liner material. For each of the sheets 22 of masking material the sheet 21 of liner material has a slit 25 between its major surfaces to define a first part 26 of the sheet 21 of liner material extending over a generally C-shaped first portion 27 of the layer 23 of pressure sensitive adhesive, and to define a second part 28 of the sheet 21 of liner material extending over a second generally rectangular portion 29 of the layer 23 of pressure sensitive adhesive, which second part 28 of the sheet 21 of liner material for each of the sheets 22 of paint masking material projects past a portion of the periphery of the sheet 22 of paint masking material and has an alignment edge 31 spaced a predetermined distance from the periphery of the sheet 22 of paint masking material. The sheets 22 of masking material are each removable from the first part 26 of the sheet 21 of liner material to expose the first portion 27 of the layer 23 of pressure sensitive adhesive (see the top sheet 22 in FIG. 3) while leaving the second part 28 of the sheet 21 of liner material adhered to the second portion 29 of the layer 23 of pressure sensitive adhesive. The removed sheet 22 of masking material with the second part 28 of the sheet 21 of liner material adhered thereto can then be positioned with the alignment edge 31 at a predetermined position with respect to structure (e.g., a ledge 33 as is illustrated in FIG. 5) along a portion of a surface 34 to which the sheet 22 of masking material is to be releasably adhered as is illustrated in FIG. 5. The exposed first portion 27 of the layer 23 of pressure sensitive adhesive on the removed sheet 22 of paint masking material can be then be pressed against and thereby adhered to the surface 34 while leaving the second part 28 of the sheet 21 of liner material adhered to the layer 23 of pressure sensitive adhesive on the sheet 22 of masking material. The second part 28 of the sheet 21 of liner material can then be peeled away from the sheet 22 of masking material and pulled from between the sheet 22 of masking material and the surface 34 while most of the first portion 27 of the layer 23 of pressure sensitive adhesive remains adhered thereto to maintain the desired position of the sheet 22 of masking material, after which the sheet 22 of masking material may be pressed against the surface 34 to firmly releasably adhere thereto the second portion 29 of the layer 23 of pressure sensitive adhesive together with any of its first portion 27 that was displaced while the second part 28 of the sheet 21 of liner material was removed. The sheet 22 of masking material will then stay in its desired location while a portion of the surface 34 around the sheet 22 of masking material is painted, after which the sheet 22 of masking material can be peeled away.

Figure 6:
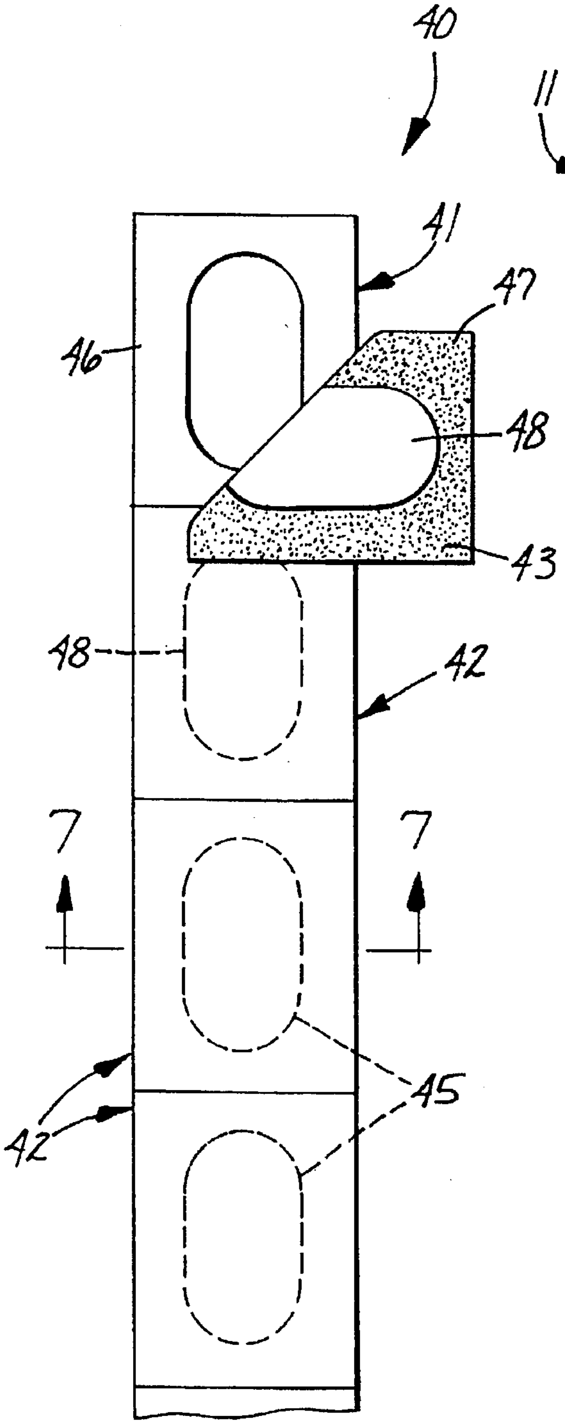
FIG. 6 is a plan view of a third embodiment of a paint masking assembly according to the present invention which includes a plurality of sheets of paint masking material, one of which with a second part of a sheet of liner material adhered thereto is illustrated with a corner turned back in the manner it would be removed from a first part of the sheet of liner material.
Figure 7:
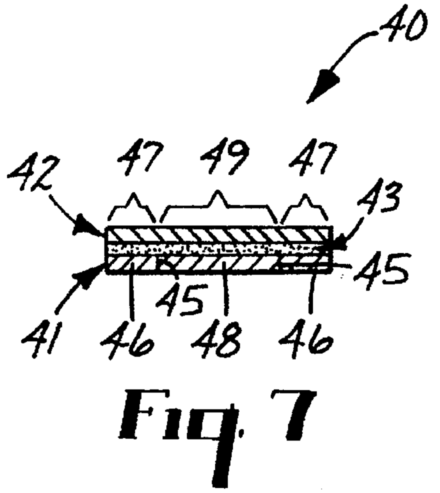
FIG. 7 is a sectional view taken approximately along line 7—7 of FIG. 6.

Referring now to FIGS. 6 and 7 of the drawing, there is shown a third embodiment of a paint masking assembly according to the present invention generally designated by the reference numeral 40.

Generally the paint masking assembly 40 comprises an elongate sheet 41 of liner material, and a plurality of continuous sheets 42 of paint masking material each having a periphery of a predetermined rectangular shape, and a layer 43 of pressure sensitive adhesive permanently adhered on one of its major surfaces; the layer 43 of pressure sensitive adhesive being releasably adhered to the sheet 41 of liner material. The sheet 41 of liner material extends across the entire layer 43 of pressure sensitive adhesive and past the periphery of each of the sheets 42 of paint masking material at the opposite ends of the sheet 42 of paint masking material. For each sheet 42 of paint masking material, the sheet 41 of liner material has a slit 45 between its major surfaces to define a first part 46 of the sheet 41 of liner material extending over a first portion 47 of the layer 43 of pressure sensitive adhesive, and a second part 48 of the sheet 41 of liner material extending over a second portion 49 of the layer 43 of pressure sensitive adhesive. The second part 48 of the sheet 41 of liner material has a periphery entirely spaced from the periphery of the sheet 42 of paint masking material so that the first portion 47 of the layer 43 of pressure sensitive adhesive extends in a continuous band around the entire periphery of the sheet 42 of paint masking material. The sheet 42 of paint masking material is removable from the first part 46 of the sheet 41 of liner material with the second part 48 of the sheet of liner material adhered thereto to expose the first portion 47 of the layer 43 of pressure sensitive adhesive by which first portion 47 the removed sheet 42 of paint masking material may be releasably adhered to a portion of a surface to be masked. Like the paint masking assembly 10, this embodiment of the paint masking assembly 40 is particularly useful where a large area is to be masked for the same reasons described above. As each sheet 42 of paint masking material is removed from the sheet 41 of liner material, an end edge of the the next sheet 42 of paint masking material is exposed along the sheet 41 of liner material, making that next sheet easily removable by lifting it along that exposed edge.

Figure 8:
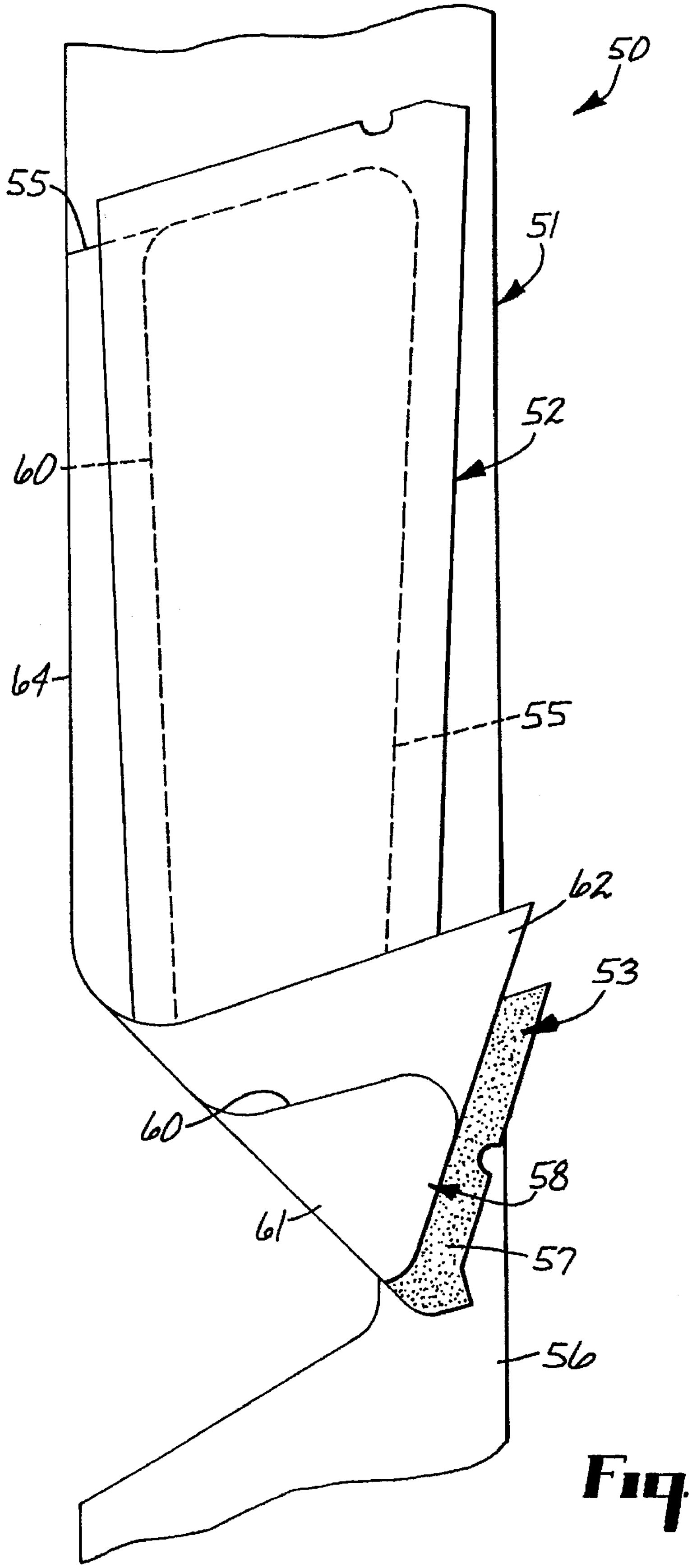
FIG. 8 is a plan view of a fourth embodiment of a paint masking assembly according to the present invention having a corner of a sheet of paint masking material with a second part of a sheet of liner material adhered thereto turned back in the manner they are removed from a first part of the sheet of liner material during use of the paint masking assembly.

Referring now to FIG. 8 of the drawing, there is shown a fourth embodiment of a paint masking assembly according to the present invention generally designated by the reference numeral 50.

Generally the paint masking assembly 50 comprises a sheet 51 of liner material, and a continuous sheet 52 of paint masking material having a periphery of a predetermined shape, and a layer 53 of pressure sensitive adhesive permanently adhered on one of its major surfaces; the layer 53 of pressure sensitive adhesive being releasably adhered to the sheet 51 of liner material. The sheet 51 of liner material extends across the entire layer 53 of pressure sensitive adhesive and past the periphery of the sheet 52 of paint masking material, and in this embodiment has a periphery spaced from and extending around the entire periphery of the sheet 52 of paint masking material so that the entire peripheral edge of the sheet 52 of paint masking material is exposed or presented for manual engagement along the surface of the sheet 51 of liner material to facilitate manual removal of the sheet 52 of paint masking material from the sheet 51 of liner material. The sheet 51 of liner material has a generally U-shaped slit 55 between its major surfaces to define a first part 56 of the sheet 51 of liner material extending over a first portion 57 of the layer 53 of pressure sensitive adhesive, and a second part 58 of the sheet 51 of liner material extending over a second portion of the layer 53 of pressure sensitive adhesive; and has a slit 60 between its major surfaces having ends intersecting the slit 55 to divide the second part 58 of the sheet of liner material into retained and removable sections 61 and 62, with the entire length of the slit 60 in the second part 58 of the sheet 51 of liner material extending along the second portion of the layer 53 of pressure sensitive adhesive and being spaced from the periphery of the sheet 52 of paint masking material. The removable section 62 of the second part 58 of the sheet 51 of liner material projects past a portion of the periphery of the sheet 52 of paint masking material and has an alignment edge 64 spaced at a predetermined position with respect to the periphery of the sheet 52 of paint masking material. The sheet 52 of paint masking material is removable from the first part 56 of the sheet 51 of liner material to expose the first portion 57 of the layer 53 of pressure sensitive adhesive while leaving the second part 58 of the sheet 51 of liner material adhered to the second portion of the layer 53 of pressure sensitive adhesive. The removed sheet 52 of masking material with the second part 58 of the sheet 51 of liner material adhered thereto can then be positioned with the alignment edge 64 at a predetermined position with respect to structure along a portion of a surface to which the sheet 52 of masking material is to be releasably adhered. The exposed first portion 57 of the layer 53 of pressure sensitive adhesive on the removed sheet 52 of paint masking material can be then be pressed against and thereby adhered to that surface while leaving the second part 58 of the sheet 51 of liner material adhered to the layer 53 of pressure sensitive adhesive on the sheet 52 of masking material. The removable section 62 of the second part 58 of the sheet 51 of liner material can then be peeled away from the sheet 52 of masking material and pulled from between the sheet 52 of masking material and that surface while most of the first portion 57 of the layer 53 of pressure sensitive adhesive remains adhered thereto to maintain the desired position of the sheet 52 of masking material, after which the sheet 52 of masking material may be pressed against that surface to firmly releasably adhere thereto the second portion of the layer 53 of pressure sensitive adhesive not covered by the retained section 61 of the second part 58 of the sheet 51 of liner material together with any of the first portion 57 of the layer 53 of pressure sensitive adhesive that was displaced while the removable section 62 of the second part 58 of the sheet 51 of liner material was removed. The sheet 52 of masking material will then stay in its desired location while a portion of the surface 54 around the sheet 52 of masking material is painted, after which the sheet 52 of masking material can be peeled away. The paint masking assembly 50, like the paint masking assembly 10 described with reference to FIGS. 1 and 2, is particularly useful where a large surface area is to be masked because after the sheet 52 of paint masking material is removed from the first part 56 of the sheet 51 of liner material and the removable section 62 of the second part 58 of the sheet 51 of liner material is removed from the layer 53 of pressure sensitive adhesive, the layer 13 of pressure sensitive adhesive can securely adhere the sheet 12 of paint masking material in place adjacent its periphery. The central portion of the sheet 12 of paint masking material, because it is covered by the retained section 61 of the second part 58 of the sheet 51 of liner material, will not be adhered to he portion of the surface being masked, and thus need not be peeled away from that surface portion after the painting of an adjacent portion of the surface is complete.

The sheets 11, 21, 41 or 51 of liner material are preferably 0.005 to 0.025 centimeter (0.002 to 0.01 inch) thick and of conventional liner materials that the layers 13, 23, 43 or 53 of pressure sensitive adhesive will easily and cleanly release from such as paper, paper coated with a polymeric material or a polymeric film which may or may not contain fillers. The sheets 12, 22, 42 or 52 of paint masking material with the layers 13, 23, 43 and 53 of pressure sensitive adhesive are preferably in the range of 0.005 to 0.025 centimeter (0.002 to 0.01 inch) thick and of types that can be intimately releasably adhered to a surface to be covered, and can then withstand baking at 250 degrees Fahrenheit (and preferably at 275 degrees Fahrenheit) for at least one half hour while still being cleanly and easily removable from the surface to which it was adhered after such baking without leaving any adhesive residue on that surface. The sheets 12, 22, 42 or 52 of paint masking material with the layers 13, 23, 43 and 53 of pressure sensitive adhesive on one surface that meet this criteria can be provided by several masking tapes, including the crepe paper backed masking tape sold under the commercial designation "No. 2317 Hi Performance Paint Masking Tape" by Minnesota Mining and Manufacturing Company, St. Paul, Minn., and the plastic film backed masking tape sold under the commercial designation "No. 219 High Temperature Fine Line" also by Minnesota Mining and Manufacturing Company.

Any of the masking assembly embodiments 1, 20 40 or 50 can be formed using well known die cutting techniques, such as by the use of spaced rotary dies on opposite sides of a laminate of the same width strips of the liner material and the adhesive coated paint masking material, with one rotary die cutting the slits in the liner and the other rotary die cutting the periphery of the paint masking material, after which any unused portion of the paint masking material, which would result from making the embodiments 1, 20 and 50, would be stripped away.

The masking assembly according to the present invention has now been described with reference to four embodiments thereof. It will be apparent to those skilled in the art that many changes can be made in the embodiments described without departing from the scope of the present invention. Thus the scope of the present invention should not be limited to the structures described in this application, but only by structures described by the language of the claims and the equivalents of those structures.

We claim:

1. A paint masking assembly for masking a first portion of a surface, which first portion of the surface has an irregular periphery, so that when masked, the first portion will remain unpainted while a second adjacent portion of the surface is painted, said paint masking assembly comprising a sheet of liner material having opposite front and rear major surfaces, and a sheet of paint masking material having opposite first and second major surfaces, a periphery of a predetermined irregular shape corresponding to the irregular peripheral shape of the first portion of the surface that is to remain unpainted, and a layer of pressure sensitive adhesive permanently adhered on said first major surface of said sheet of paint masking material, said layer of pressure sensitive adhesive being releasably adhered to the front surface of said sheet of liner material and being releasably adherable to the first portion of the surface that is to remain unpainted, said sheet of liner material extending across the entire layer of pressure sensitive adhesive and past the periphery of said sheet of paint masking material, and being slit between said major surfaces to define a first part of said sheet of liner material having a periphery and extending over a first portion of said layer of pressure sensitive adhesive, and a second part of said sheet of liner material extending over a second portion of said layer of pressure sensitive adhesive, the entire periphery of the second part of said sheet of liner material being spaced from the periphery of said sheet of paint masking material so that the first portion of said layer of pressure sensitive adhesive extends in a continuous band entirely around the periphery of the second part of the sheet of liner material between the periphery of the second part of the sheet of liner material and the periphery of said sheet of paint masking material, said sheet of paint masking material and said second part of said sheet of liner material adhered to said layer of pressure sensitive adhesive being removable from said first part of said sheet of liner material to expose said first portion of said layer of pressure sensitive adhesive by which first portion of said layer of pressure sensitive adhesive said removed sheet of paint masking material and said second part of said sheet of liner material are releasably adherable to the first portion of the surface that is to remain unpainted, and said sheet of paint masking material and said layer of pressure sensitive adhesive being of heat resistant material that while adhered to the first portion of the surface that is to remain unpainted can withstand baking at at least 250 Fahrenheit for at least one half hour while still being cleanly and easily manually removable from the first portion of the surface that is to remain unpainted after such baking without leaving any of the layer of pressure sensitive adhesive on the first portion of the surface that is to remain unpainted.

2. A paint masking assembly for masking a first portion of a surface, which first portion of the surface has an irregular periphery, so that when masked, the first portion will remain unpainted while a second adjacent portion of the surface is painted, said paint masking assembly comprising a sheet of liner material having opposite front and rear major surfaces, and a sheet of paint masking material having opposite first and second major surfaces, a periphery of a predetermined irregular shape corresponding to the irregular peripheral shape of the first portion of the surface that is to remain unpainted, and a layer of pressure sensitive adhesive permanently adhered on said first major surface of said sheet of paint masking material, said layer of pressure sensitive adhesive being releasably adhered to the front surface of said sheet of liner material and being releasably adherable to the first portion of the surface that is to remain unpainted, said sheet of liner material extending across the entire layer of pressure sensitive adhesive and past the periphery of said sheet of paint masking material, and being slit between said major surfaces to define a first part of said sheet of liner material extending over a first portion of said layer of pressure sensitive adhesive, and a second part of said sheet of liner material extending over a second portion of said layer of pressure sensitive adhesive, the entire periphery of the second part of said sheet of liner material being spaced from the periphery of said sheet of paint masking material so that the first portion of said layer of pressure sensitive adhesive extends in a continuous band entirely around the periphery of the second part of the sheet of liner material between the periphery of the second part of the sheet of liner material and the periphery of said sheet of paint masking material, and said second part of said sheet of liner material being slit to define first and second pieces of said second part of said sheet of liner material with said first piece projecting past a portion of the periphery of said sheet of paint masking material and having a peripheral edge portion at a location with respect to the periphery of the sheet of paint masking material adapted for use to locate the sheet of paint masking material along the first portion of the surface that is to remain unpainted, said sheet of paint masking material together with said second piece of said first part and said second part of said sheet of liner material adhered to said layer of pressure sensitive adhesive being removable from said first piece of the first part of said sheet of liner material to expose part of said first portion of said layer of pressure sensitive adhesive by which part of said first portion of said layer of pressure sensitive adhesive said removed sheet of paint masking material and said second part of said sheet of liner material can be partially adhered to the first portion of the surface that is to remain unpainted with said peripheral edge of said first piece of the second part of said sheet of liner material being used to locate said sheet of paint masking material along the first portion of said surface that is to remain unpainted, after which said first piece of the second part of said sheet of liner material can be removed to afford full adhesion of said first portion of said layer of pressure sensitive adhesive along the first portion of said surface that is to remain unpainted.

3. A paint masking assembly according to claim 2, wherein said second part of said sheet of liner material has a slit dividing said second part of the sheet of liner material into retained and removable sections, the entire length of said slit in said second part of said sheet of liner material extending along the second portion of said layer of pressure sensitive adhesive and being spaced from the periphery of said sheet of paint masking material.

4. A paint masking assembly for masking a first portion of a surface, which first portion of the surface has an irregular periphery, so that when masked, the first portion will remain unpainted while a second adjacent portion of the surface is painted, said paint masking assembly comprising an elongate sheet of liner material having opposite front and rear major surfaces, and a plurality of sheets of paint masking material each having opposite major first and second surfaces, a periphery of a predetermined irregular shape corresponding to the peripheral shape of the first portion of the surface that is to remain unpainted, and a layer of pressure sensitive adhesive permanently adhered on said first major surface of said sheet of paint masking material, said layers of pressure sensitive adhesive of said sheets of masking material being releasably adhered along the front surface of said sheet of liner material, and being releasably adherable to the first portion of the surface that is to remain unpainted, said sheet of liner material extending across the entire layer of pressure sensitive adhesive and past the periphery of each of said sheets of masking material, and being slit between said major surfaces to define a first part of said sheet of liner material extending over first portions of said layers of pressure sensitive adhesive of said sheets of masking material, and to define for each of said sheets of masking material a second part of said sheet of liner material extending over a second portion of said layer of pressure sensitive adhesive, the entire periphery of the second part of said sheet of liner material being spaced from the periphery of said sheet of paint masking material so that the first portion of said layer of pressure sensitive adhesive extends in a continuous band entirely around the periphery of the second part of the sheet of liner material between the periphery of the second part of the sheet of liner material and the periphery of said sheet of paint masking material, each of said sheets of paint masking material and the second part of said sheet of liner material adhered to the layers of pressure sensitive adhesive on that sheet of paint masking material being removable from said first part of said sheet of liner material to expose said first portion of said layer of pressure sensitive adhesive by which first portion of said layer of pressure sensitive adhesive said removed sheet of paint masking material and said second part of said sheet of liner material adhered thereto are releasably adherable to the first portion of the surface that is to remain unpainted, and each of said sheets of paint masking material and said layers of pressure sensitive adhesive being of heat resistant material that while adhered to the first portion of the surface that is to remain unpainted can withstand baking at at least 250 Fahrenheit for at least one half hour while still being cleanly and easily manually removable from the first portion of the surface that is to remain unpainted after such baking without leaving any of the layer of pressure sensitive adhesive on the first portion of the surface that is to remain unpainted.

5. A paint masking assembly according to claim 4, wherein for each of said sheets of paint masking material said second part of said sheet of liner material is slit to define first and second pieces of said second part of said sheet of liner material with said first piece projecting past a portion of the periphery of the sheet of paint masking material and having a peripheral edge portion at a predetermined location with respect to the periphery of the sheet of paint masking material adapted for use to locate the sheet of paint masking material along the first portion of the surface that is to remain unpainted said sheet of paint masking material together with said second piece of said first part and said second part of said sheet of liner material adhered to said layer of pressure sensitive adhesive being removable from said first piece of the first part of said sheet of liner material to expose part of said first portion of said layer of pressure sensitive adhesive by which part of said first portion of said layer of pressure sensitive adhesive said removed sheet of paint masking material and said second part of said sheet of liner material can be partially adhered to the first portion of the surface that is to remain unpainted with said peripheral edge of said first piece of said second part of said sheet of liner material being used to locate said sheet of paint masking material along the first portion of said surface that is to remain unpainted, after which said first piece of said second part of said sheet of liner material can be removed to afford full adhesion of said first portion of said layer of pressure sensitive adhesive along the first portion of said surface that is to remain unpainted.

6. A paint masking assembly according to claim 5, wherein said second part of said sheet of liner material for each of said sheets of paint masking material has a slit dividing said second part of the sheet of liner material into retained and removable sections, the entire length of said slit in said second part of said sheet of liner material extending along the second portion of said layer of pressure sensitive adhesive and being spaced from the periphery of said sheet of paint masking material.

* * * * *